(12) United States Patent
Widlacki et al.

(10) Patent No.: US 7,024,824 B1
(45) Date of Patent: Apr. 11, 2006

(54) ENTRY PORT

(76) Inventors: Felix Widlacki, 15178 Grandview Dr., Orland Park, IL (US) 60467; Frederick Schmidt, 20208 Greenfield, Frankfort, IL (US) 60423

( * ) Notice: Subject to any disclaimer, the term of this patent is extended or adjusted under 35 U.S.C. 154(b) by 28 days.

(21) Appl. No.: 10/655,249

(22) Filed: Sep. 4, 2003

(51) Int. Cl.
 *E04D 1/36* (2006.01)
 *E04D 13/14* (2006.01)
 *E04D 3/38* (2006.01)

(52) U.S. Cl. ............... 52/58; 52/60; 52/198; 52/220.8; 285/42

(58) Field of Classification Search .............. 52/58, 52/60, 219, 220.8, 198; 29/448, 449; 285/42
See application file for complete search history.

(56) References Cited

U.S. PATENT DOCUMENTS

| | | | | |
|---|---|---|---|---|
| 1,053,743 A | * | 2/1913 | Paiste | 439/753 |
| 2,614,868 A | * | 10/1952 | Robinson | 285/203 |
| 3,757,986 A | * | 9/1973 | Eichinger | 220/304 |
| 4,233,726 A | * | 11/1980 | Williams | 29/507 |
| 4,334,703 A | * | 6/1982 | Arthur et al. | 285/222 |
| 4,358,079 A | | 11/1982 | Navarro | |
| 4,934,117 A | * | 6/1990 | Barksdale | 52/219 |
| 5,190,408 A | | 3/1993 | Ozeki et al. | |
| 5,347,776 A | * | 9/1994 | Skoff | 52/219 |
| 5,670,744 A | | 9/1997 | Ritchey | |
| 5,946,863 A | * | 9/1999 | Bullard | 52/58 |
| 5,950,381 A | | 9/1999 | Stansbie | |
| 5,970,667 A | * | 10/1999 | Thaler | 52/219 |
| 6,279,272 B1 | * | 8/2001 | Nill, Jr. | 52/58 |
| 6,305,425 B1 | | 10/2001 | Korn | |
| 6,394,690 B1 | | 5/2002 | Bartholomä et al. | |
| 6,511,099 B1 | | 1/2003 | Bartholomä et al. | |
| 6,536,718 B1 | | 3/2003 | Benito-Navazo | |

* cited by examiner

*Primary Examiner*—Carl D. Friedman
*Assistant Examiner*—Yvonne M. Horton
(74) *Attorney, Agent, or Firm*—Barnes & Thornburg LLP; Timothy J. Engling

(57) ABSTRACT

An entry port including at least one cylinder with a lip on the attachment portion surrounding each hole in a plate. The rim surrounding each hole is rolled over a lip on a corresponding cylinder to secure each cylinder to the plate to form the entry port. Each cylinder preferably has a flared circumference on the portion away from the attachment to the plate to allow a boot to be clamped on each cylinder.

9 Claims, 2 Drawing Sheets

ENTRY PORT

BACKGROUND

The present disclosure relates to an entry port and the method of making the same. More particularly, the disclosure relates to an entry port wherein a lip on the rim of the hole of the plate is rolled over a lip on a cylinder to secure the plate and the cylinder of an entry port.

An entry port is a typical passage by which a cable enters into a structure or a building. A flat plate with a hole in it is associated with part of the wall of the structure or building. A cylinder is attached to the rim of the hole in the flat plate, and the cylinder extends into the wall when the entry port is used.

Previously, the cylinder and the plate with a hole were riveted together using a flange. A gasket had to be placed between the two components to seal them.

The advantages of the entry port disclosed herein will be apparent from the following description, the accompanying drawings and the appended claims.

SUMMARY

The invention may be described as an entry port having a right circular cylinder attached to the rim of a hole in a plate. This cylinder is attached to the plate by a raised lip on the plate being rolled over a corresponding lip on the cylinder.

Other structural features include a flare on the distal portion of the cylinder from the attachment to the plate, which allows clamping of a corresponding boot onto the cylinder of the entry port. A standard boot can be placed around the cylinder and clamped into place with a hose clamp, which is similarly used with an entry port that is riveted with a gasket between the components.

The method of making the entry port includes forming two separate components: a plate with a hole or series of holes that has a raised lip around each hole, and a cylinder with a lip projecting inwardly forming a smaller radius on the attachment portion of the cylinder. The attachment portion of the cylinder is placed on the plate surrounding the hole in the plate with the lip of the cylinder adjacent the lip around the hole of the plate. The raised lip of the plate is rolled over the lip on the attachment portion of the cylinder to secure these components together.

The proposed structure and related method allow the components to be secured together in a waterproof manner without using a gasket or rivets.

The components can be made on standard metal stamping equipment, such as the cylinder being made from a punch press and the plate being stamped and formed with a lip on various machines. A die can roll the raised lip of the plate around the lip of the attachment portion of the cylinder. Although the preferred components are made out of metal on metal stamping equipment, plastic components and plastic molding may be acceptable in certain circumstances.

BRIEF DESCRIPTION OF THE DRAWINGS

The features of this invention and the manner of obtaining them will become more apparent, and the invention itself will be best understood by reference to the following description of embodiments of the entry port taken in conjunction with the accompanying drawings in which.

DETAILED DESCRIPTION

While the present invention will be described fully hereinafter with reference to the accompanying drawings, in which a particular embodiment is shown, it is to be understood at the outset that persons skilled in the art may modify the embodiments disclosed herein while still achieving the desired result. Accordingly, the description that follows is to be understood as a broad informative disclosure directed to persons skilled in the appropriate art and not as limitations of the present invention.

Figure 1:
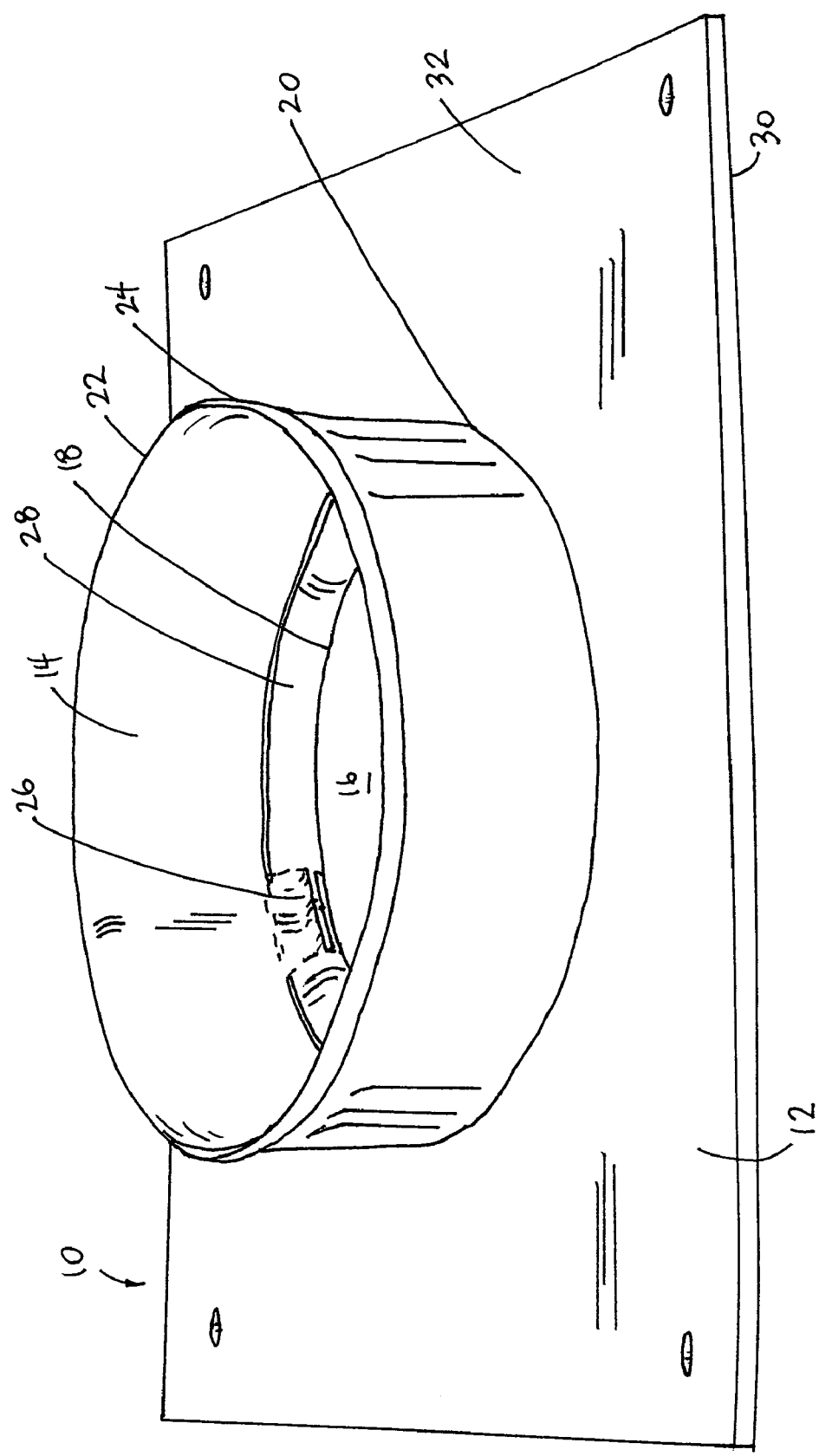
FIG. 1 is a perspective view of an entry port.
Figure 2:
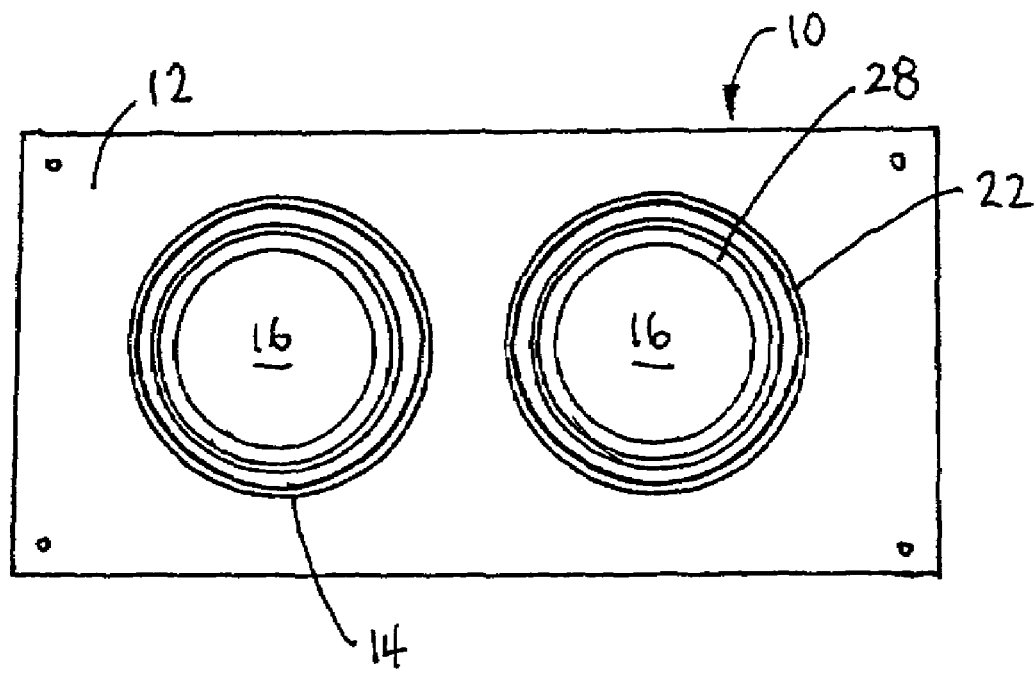
FIG. 2 is a view of a cylinder side of an entry port with multiple cylinders.

In the Figures, like reference numerals indicate the same element throughout. FIG. 1 shows an entry port 10, including a plate 12 and a cylinder 14. The plate 12 includes a hole 16 or a series of holes defined by a rim 18 that is the circumference of the hole 16. The plate 12 may be slightly angled inwardly from the hole 16, preferably at a 3 degree angle, on the cylinder side to assist in sealing the entry port 10 to a building wall.

The cylinder 14 includes an attachment portion 20 and a distal portion 22. The cylinder 14 is preferably a right circular cylinder. The distal portion 22 of the cylinder 14 may include a flared circumference 24 to assist in allowing the clamping of a standard boot onto the cylinder 14 of the entry port 10. A standard boot can be placed around the distal portion 22 of the cylinder 14 and clamped into place with a hose clamp. The cylinder 14 includes a lip 26 on the attachment portion 20. The lip 26 has a smaller circumference than the other portions of the cylinder 14.

The lip 26 of the cylinder 14 surrounds each hole 16 of the entry port 10. The lip 26 is coupled with a rolled rim lip 28, which is integral with plate 12. The rolled rim lip 28 forms an attachment with the lip 26 of the cylinder 14 that is substantially waterproof and resistant to adverse environmental factors associated with the outer surface 30 of the plate 12.

Both the plate 12 and the cylinder 14 are preferably made from aluminum, but the entry port 10 may be molded of suitable non-metallic substances, such as plastic. An entry port 10 made of sheet metal can be made from two components, the plate 12 and cylinder 14, on metal stamping equipment. For example, the cylinder 14 can be made from a punch press, and the plate 12 can be stamped and formed with a lip on various machines. A cylinder 14 is placed around each rim 18 of plate 12 on the inner surface 32. A die machine can roll the rim 18 over the lip 26 of the cylinder 14 to form rolled rim lip 28.

Figure 3:
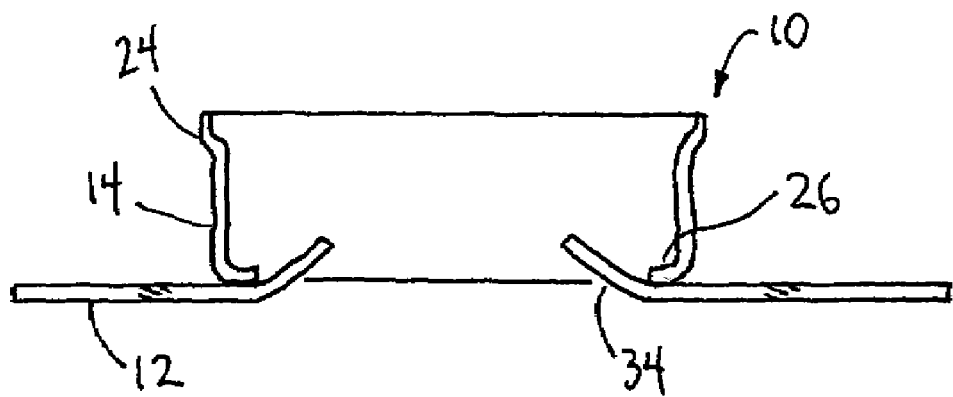
FIG. 3 is a schematic cross-sectional view showing how a raised lip surrounding the hole on the plate is rolled over a lip on an attachment portion of a cylinder.

As can be seen in FIG. 3, before attachment of the cylinder 14, the plate 12 has an inwardly tapered rim lip 34 that is tapered as the circumference of rim 18 becomes smaller. The inwardly tapered rim lip 34 can be rolled over lip 26 of the cylinder 14 to form rolled rim lip 28 thereby securing the plate 12 and cylinder 14 together to form the entry port 10.

An entry port 10 is the passage by which a cable enters into a structure or a building. The cable passes through hole 16 through cylinder 14. The outer surface 30 of the plate 12 is in association with the outer surface or wall of the structure or building. The plate 12 is slightly angled inwardly, preferably at a 3 degree angle, bending toward the inner surface 32 to assist in sealing the entry port 10 to the structure or building wall. The cylinder 14 passes through an aperture in the structure or building and may be surrounded by the wall of the structure or building.

A method for making an entry port 10 includes the steps of:
- forming a plate 12 with a hole 16 and an inwardly tapered rim lip 34 surrounding the hole 16;
- forming a cylinder 14 with a lip 26 on an attachment portion 20 of the cylinder 14; Also, the cylinder 14 preferably has a flared circumference 24 on a distal portion 22;
- placing the attachment portion 20 of cylinder 14 around each inwardly tapered rim lip 34 of the plate 12; and
- rolling the inwardly tapered rim lip 34 around the lip 26 of the cylinder 14 to form a rolled rim lip 28 to secure the cylinder 14 to the plate 12. The rolling of the inwardly tapered rim lip 34 is sometimes called hemming.

In normal use, a boot is placed around the cylinder 14 and secured to the entry port 10 with a hose clamp. Flared circumference 24 on the distal portion 22 of the cylinder 14 allows the clamp to better keep the boot in place.

Similarly, a method of manufacturing an entry port 10 having multiple cylinders 14 includes the steps of:
- forming a plate 12 with numerous holes 16 having an inwardly tapered rim lip 34 surrounding each hole 16;
- forming cylinders 14 with a lip 26 on an attachment portion 20 of each cylinder 14;
- placing the attachment portion 20 of each cylinder 14 around each inwardly tapered rim lip 34 of the plate 12; and
- rolling each inwardly tapered rim lip 34 around the corresponding lip 20 of each cylinder 14 to form a rolled rim lip 28 to secure each cylinder 14 to the plate 12.

Although the drawings show a certain number of cylinders 14 surrounding hole 16, there may be numerous cylinders 14 surrounding holes 16 on an entry port 10. Normally, there are sixteen variations of entry ports with the largest including 24 holes arranged as four rows of six holes.

Although the preferred embodiment of the disclosure is illustrated and described in connection with particular features, it can be adapted for use with a variety of entry ports, shapes, sizes and materials. Other embodiments and equivalent entry ports and methods are envisioned within the scope of the claims. Various features of the disclosure have been particularly shown and described in connection with the illustrated embodiment, however, it must be understood that the particular embodiments merely illustrate and that the invention is to be given its fullest interpretation within the terms of the appended claims.

What is claimed is:

1. An entry port adapted for attachment to a structure, the entry port comprising: a cylinder having an inwardly protruding lip on an attachment portion of the cylinder, wherein the cylinder includes a flared circumference on a distal portion, and a plate having a rim defining a hole with a rim lip that overlaps the lip of the cylinder wherein the rim lip is bent over the lip of the cylinder to secure the cylinder to the plate.

2. The entry port of claim 1 wherein the cylinder is a right circular cylinder.

3. The entry port of claim 1 wherein the plate is bent at a 3 degree angle extending from the hole.

4. A method of manufacturing an entry port comprising steps of:
- forming a plate with a hole and an inwardly tapered rim lip surrounding the hole;
- forming a cylinder with an inwardly protruding lip on an attachment portion of the cylinder, wherein the step of forming the cylinder includes forming a flared circumference on a distal portion of the cylinder;
- placing the attachment portion of the cylinder around the inwardly tapered rim lip of the plate; and
- rolling the inwardly tapered rim lip around the lip of the cylinder to form a rolled rim lip to secure the cylinder to the plate.

5. The method of claim 4 wherein the step of forming the plate includes slightly bending the plate.

6. A method of manufacturing an entry port comprising steps of:
- forming a plate with numerous holes having an inwardly tapered rim lip surrounding each hole;
- forming cylinders with an inwardly protruding lip on an attachment portion of each cylinder;
- placing the attachment portion of each cylinder around each inwardly tapered rim lip of the plate; and
- rolling each inwardly tapered rim lip around the corresponding lip of each cylinder to form a rolled rim lip to secure each cylinder to the plate.

7. An entry port adapted for attachment to a structure, the entry port consisting of only a cylinder and a plate: the cylinder having an inwardly protruding lip on an attachment portion of the cylinder and the plate having a rim defining a hole with a rim lip that overlaps the lip of the cylinder wherein the rim lip is a circumference of the hole and the rim lip is rolled over the lip of the cylinder to secure the cylinder to the plate.

8. An entry port adapted for attachment to a structure, the entry port comprising: a cylinder having an inwardly protruding lip on an attachment portion of the cylinder and a plate having a rim defining a hole with a rim lip that overlaps the lip of the cylinder to secure the cylinder to the plate, wherein the rim lip forms a continuous curvilinear circle and wherein the cylinder includes a flared circumference on a distal portion.

9. The entry port of claim 8 wherein the cylinder is a right circular cylinder.

* * * * *